Jan. 4, 1966

J. L. MERO 3,226,854

DREDGE UNDERWATER PICK-UP HEAD ASSEMBLY

Filed April 29, 1963

INVENTOR.
JOHN L. MERO

BY

Bruce + Brosler

HIS ATTORNEYS

United States Patent Office 3,226,854
Patented Jan. 4, 1966

3,226,854
DREDGE UNDERWATER PICK-UP HEAD ASSEMBLY
John L. Mero, 1091 Via Roble, Lafayette, Calif.
Filed Apr. 29, 1963, Ser. No. 276,422
5 Claims. (Cl. 37—58)

My invention relates to underwater dredging and more particularly to a pick-up head assembly for use in ocean floor mining.

Ocean floor mineral deposits containing ore-grade amounts of important industrial metals such as manganese, nickel, cobalt, and copper are commonly found in the form of grains or nodules, lying loose at the surface of the soft sea floor sediments; as grains or nodules within the sea floor sediment; as crusts on ocean floor rock outcroppings and other debris; as replacement fillings in calcareous and other debris; and in other less important forms. From an economic standpoint, the most interesting of these forms are the nodules which lie scattered in great abundance over the ocean floor. Recent studies have indicated that literally hundreds of billions of tons of these mineral containing nodules are lying on the surface of the soft ocean floor sediments.

Samples of this potential ore material can readily be recovered by drag dredging, a method used by oceanographers for many years to obtain geological and biological specimens from the ocean floor. Because of the long time consumed in raising and lowering the dredge device at the end of a cable this method, while effective in sampling deposits, would not be economically feasible for large scale mining except possibly in very shallow water. For commercial operation in deep ocean water, the drag line method could not be employed economically.

Various means have been designed and contemplated for reaching to great depths of the order of thousands of feet to reach the richer concentrations of such mineral deposits on the ocean floor. Certain of these are designed for hydraulic operation, and the present invention relates to a pick-up head assembly adapted for use with such type of equipment.

Among the objects of my invention are:

(1) To provide a novel and improved pick-up head assembly, adapted for ocean bottom mining;

(2) To provide a novel and improved pick-up head assembly which will work efficiently in the recovering of ore nodules from the ocean floor;

(3) To provide a novel and improved pick-up head assembly which may be hydraulically controlled;

(4) To provide a novel and improved pick-up head assembly which will automatically separate and discard, items of excessive size.

Additional objects of my invention will be brought out in the following description of a preferred embodiment of the same, taken in conjunction with the accompanying drawings, wherein.

Figure 1:
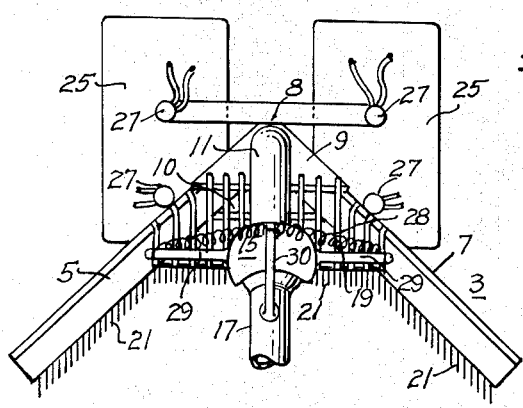
FIG. 1 is view looking down into a pick-up head assembly of the present invention.
Figure 2:
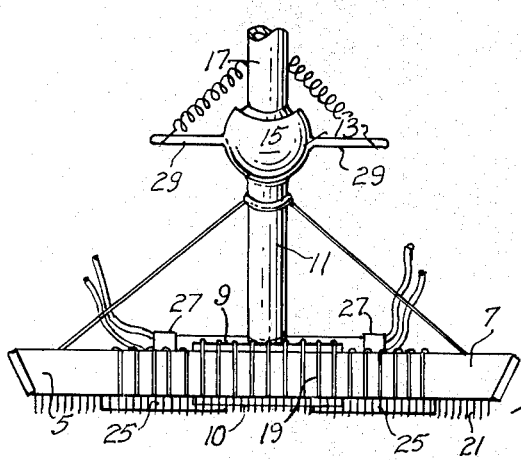
FIG. 2 is a front view in elevation of the assembly of FIG. 1.
Figure 3:
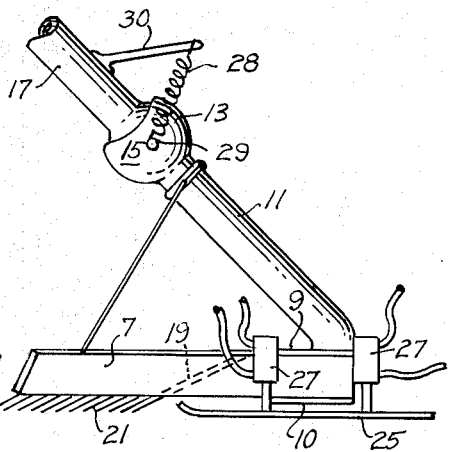
FIG. 3 is a side view in elevation of the assembly of FIG. 1.

The pick-up head assembly in its preferred form as illustrated in FIGURES 1 through 3 of the drawings, comprises a substantially V-shape frame 3 including a pair of frame wing members 5 and 7 converging to a vertex 8, at which point upper and lower corner plates 9 and 10 are applied. In the upper plate 9, a vacuum pipeline coupling section 11 is located. Such pipeline section is preferably directed upwardly at an acute angle to the plane of the V-shape frame, and terminates in one element 13 of a ball joint 15, for enabling the coupling of the pick-up head assembly to the lower end of a pipeline 17 through which the ore nodules will be carried up to the surface. The diameter of this pipeline and coupling section will determine the maximum size of nodules to be carried up through the pipeline to the surface, and from a practical consideration, it is desirable that the maximum size nodules to be recovered from the ocean floor should not exceed in diameter, half the diameter of the pipeline.

To assure such limitation as to size, means are incorporated into the pick-up head assembly for sorting out and removing elements or items exceeding such size. This may take the form of a grating 19 disposed across the path traversed by the relative flow of material to the intake end of the pipe coupling section, the spacing between the elements of the grating being approximately half the diameter of the pipeline to the surface. The grating, to be of maximum effectiveness, extends from an intermediate point on one wing member to a corresponding point on the other wing member of the frame, and slopes rearwardly towards the vertex end of the frame, whereby over-sized nodules gathered within the mouth of the frame during a dragging operation of the pick-up head assembly, will be caused to ride up the grating and ultimately be discarded, while the smaller nodules will be passed by the grating and permitted to reach the entrance to the pipe coupling section.

A good percentage of the nodules on the ocean floor, lie buried or partially buried in the silt or sedimentary deposits to be found there, and to assure that these will, in great measure, be picked up and gathered into the pick-up head assembly, I provide along the lower edges of the wing member 5 and 7 of the frame to the grating and along the lower edge of the grating, a multitude of prongs or fingers 21, directed downwardly and forwardly in the direction of intended movement of the pick-up head assembly during a dragging operation thereof, whereby such prongs will free and guide such nodules into the pick-up head frame for sorting by the grating, with those nodules within the desired size range being ultimately guided to the entrance of the pipeline.

A pick-up head assembly as thus far described, might display a tendency to dig in during operational movements thereof, and to forestall this and cause the pick-up head assembly to ride an even keel on the soft sedimentary deposits along the ocean floor, skid means are provided in the form of a pair of skids 25 of relatively large area, located adjacent the trailing sides of the wing members 5 and 7 and symmetrically with respect thereto.

The frame is, preferably, made adjustable in elevation with respect to the skids, so as to adjust the frame relative to the surface of the ocean floor whereby the nodules may be taken in the pipe line with a minimum of gangue sediments. Toward this end, each skid is hydraulically attached to the frame by one or more two-way cylinder assemblies 27 controllable from the ocean surface.

Springs 28 connecting diametrically disposed arms 29 on the ball joint 15 to a rearwardly directed arm 30 from the pipe section above, will serve to maintain proper directional attitude of the pick-up head assembly.

It will be appreciated from the foregoing description of the pick-up head assembly of the present invention, that, as the same is caused to move along the ocean floor, nodules in the path of movement thereof, will be gathered into the frame with the over-size nodules being sorted out and discarded, while those within the desired size range are guided to the suction line for lifting to the surface.

Improved effectiveness in the gathering of the nodules into the pick-up head assembly may be realized by tilting the frame wing members 5 and 7 outwardly, and it is within the contemplation of my invention to do this.

Figure 4:
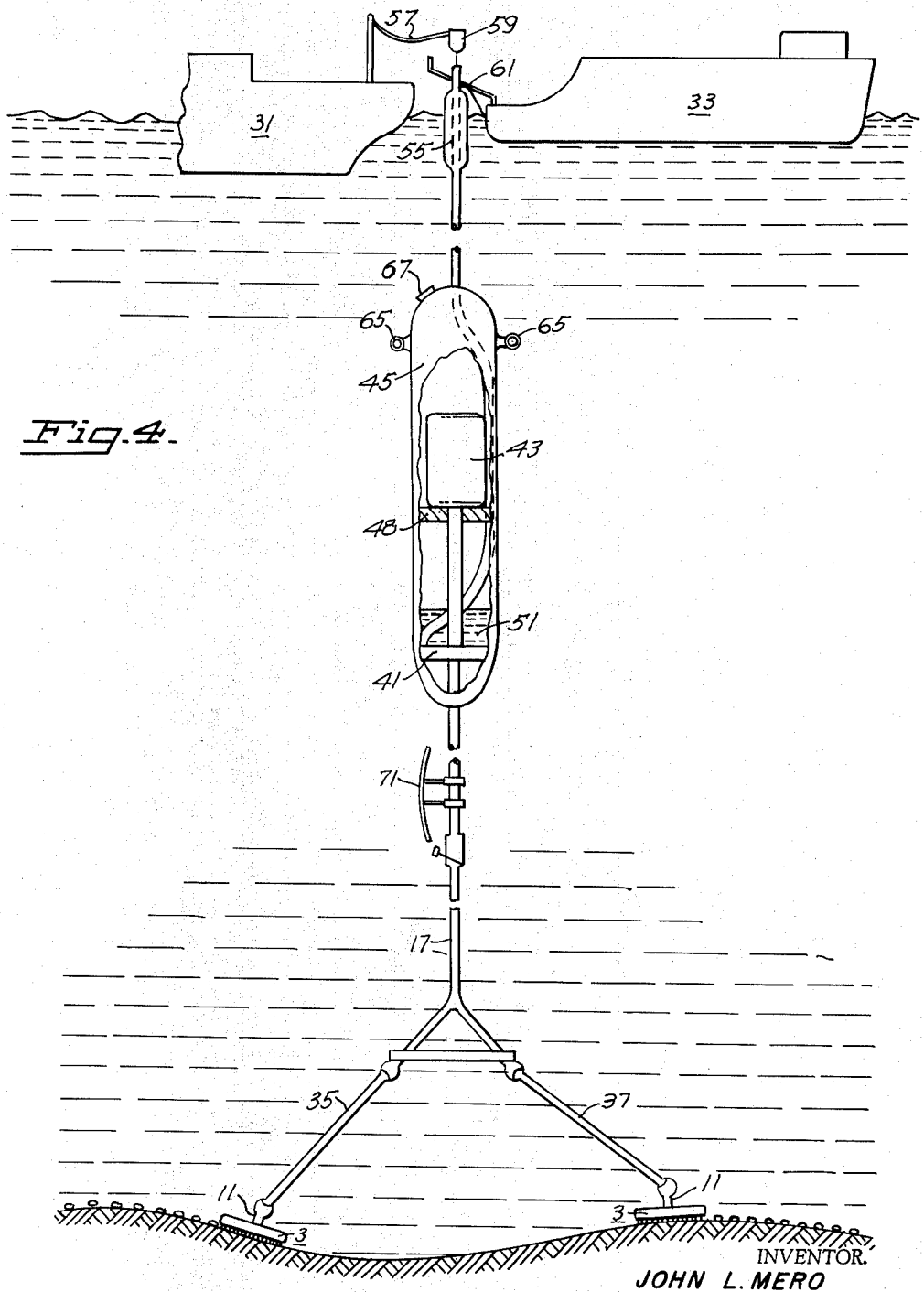
FIG. 4 is a schematic view of a dredge system to which the present invention is applicable.

The pick-up head assembly is adapted for use with a dredge system of the hydraulic type, as schematically illustrated in one form in FIGURE 4 of the drawings. This particular dredging system calls for a control ship 31 and a storage barge 33, the control ship carrying all the power and control equipment, while the storage barge is utilized to receive the recoveries from the ocean floor. The pipeline 17 extends from a point above the surface of the water down to a point approaching the ocean bottom, where it divides into two branches 35, 37, the terminal end of each of which carries the mating portion of the ball joint 15 which permits of coupling the pipeline to the pipe coupling section 11 associated with the pick-up head assembly. Accordingly, with the system under consideration, a pair of pick-up head assemblies of the present invention will be employed.

At an intermediate point of the pipeline is a pump 41, preferably one of the centrifugal type, and this is driven by a prime mover such as an electric motor 43.

The electric motor and pump are installed in an oversized float chamber or tank 45, the motor being mounted on a suitable motor mount 48 located at an intermediate position in the tank, preferably at a distance of approximately fifty feet above the pump, which is located at the lower end of the tank. This oversized tank is adapted to be ballasted with sea water 51 to give the entire pipeline assembly proper trim, the ballast being capable of being pumped into and out of the tank, as necessary, by suitable pumping means (not shown) on the control ship. Thus the ballast tank is adapted to be submerged to any desired depth below the surface of the water, and by submerging it sufficiently to bring it below the turbulent water zone, which occupies a depth of approximately one hundred feet from the surface, the ballast tank may be relied on to impart stability to the system, while at the same time reducing the suction power requirements of the pump 41.

That portion of the pipeline above the ballast tank 45 may be suported at the surface of the water by an auxiliary float tank 55 which could be of smaller size than the ballast tank 45 by reason of the fact that it would carry less of the weight of the entire system.

Power may be conveyed to the pump motor 43 from the control ship, through a power line 57 and a commutator 59 carried by the auxiliary float, and from which the circuit wires may be carried down to the motor 43.

With a dredge system of the type as schematically outlined, the pick-up head assemblies will be substantially free of exposure to wave motion. After the ballast tank has been submerged to the proper desired depth, the pump motor is then energized and the pump will begin drawing water up from the pick-up head through the pipeline to the surface, and with it, the nodules that may have been gathered into the pick-up head assembly during dragging movement of the pick-up head. The discharge from the pipeline may be directed upon a screen 61 supported in sloping relationship to the storage ship, whereupon the water and sediment will drop through, permitting the nodules to roll off the screen into the storage ship, from which it may subsequently be loaded to a transport vessel for conveyance to shore, and ultimately to a mill for processing.

Should either of the pick-up head assemblies not be properly adjusted as to skid elevation to function most effectively, as may be visually determined from the control vessel with the aid of underwater television, proper adjustments may be accomplished from the control vessel, through control of the pistons in the cylinder assemblies coupling the frame to the skids.

While the entire system may be towed behind the control ship, the linear speed of the ship which would be required in order to cover an adequate area to make the operation feasible, would necessitate considerable power. To minimize such use of power, a substantial area may be covered by rotating the entire pipeline installation, an operation which the above described arrangement is admirably adapted for. This, coupled with slow linear movement of the ship, will enable the operation to cover a large area with minimum expenditure of power. Such rotational maneuvering of the system can be readily accomplished by providing propulsion motors 65 on the side of the main float tank 45, or in the alternative, through the expediency of a shaft and gear arrangement at the surface, driven by a motor aboard one of the ships.

To further decrease the power requirements for maneuvering such system, it is proposed to take advantage of prevailing ocean currents at depths below the surface, and toward this end, I adjustably affix to the pipeline at the level of a favorable current, one or more "sails" 71, against which such current will impinge, and should the system be operated by rotating the same, the "sails" may be rotatably affixed to the pipeline to maintain proper attitude.

Should there be a failure in either the motor 43 or pump 41, the ballast can be pumped out of the tank 45 causing it to rise to the surface. A manhole 67 provided in the upper end of the tank, would allow easy access by technicians to the inside of the tank to service the equipment within.

The inside of the main float tank is preferably maintained at a pressure equal to the water pressure outside at the level of the sea water ballast therein, and when the pressure is so adjusted, the tank will not be exposed to collapsing pressures from the outside.

From the foregoing description of my invention and its application to one particular type of dredge system, it will be apparent that the same will fulfill all the objects of my pick-up head assembly, and while I have illustrated and described the same in substantial detail, I do not desire to be limited in my protection to the specific details illustrated and described, except as may be necessitated by the appended claims.

I claim:

1. A pick-up head assembly adapted for deep sea mining along the ocean floor, comprising a substantially bottomless V-shape frame including a pair of generally horizontally disposed frame wing members converging rearwardly to a vertex and adapted to traverse the ocean floor with said frame lying substantially parallel to the ocean floor, a vacuum pipe coupling extending upwardly from said frame with its intake end at substantially said vertex, grating means extending across the path traversed by a flow of material to the vertex, said grating sloping upwardly and in a generally rearwardly direction, means for freeing such items from the silt layer normally existing on the ocean floor during such movement, for facilitating gathering in of such items toward said grating for assortment during such movement, said last named means including a plurality of prongs affixed to and along said wing members and extending below the lower edges thereof and in the general direction of intended movement of said pick-up head assembly.

2. A pick-up head assembly adapted for deep sea mining along the ocean floor, comprising a substantially bottomless V-shape frame including a pair of generally horizontally disposed frame wing members converging rearwardly to a vertex and adapted to traverse the ocean floor with said frame lying substantially parallel to the ocean floor, a vacuum pipe coupling section extending upwardly from said frame with its intake end at substantially said vertex, means for separating from available items on said ocean floor, items of a predetermined range size, as said frame gathers in items along the ocean floor during movement of said frame therealong, said means including grating extending across the path traversed by relative flow of material to the intake end of said pipe coupling section and sloping upwardly and in a generally rearwardly direction, said grating having a spacing between grating elements approximately half the diameter of said suction pipe to elevate the discard rearwardly of said pick-up head assembly items exceeding such spacing, during movement of said pick-up head assembly, along the ocean floor, and means for freeing such items from the silt layer normally existing on the ocean floor during such movement, for facilitating gathering in of such items toward said grating for assortment during such movement.

3. A pick-up head assembly adapted for deep sea mining along the ocean floor, comprising a substantially bottomless V-shap frame including a pair of generally horizontally disposed frame wing members converging rearwardly to a vertex and adapted to traverse the ocean floor with said frame lying substantially parallel to the ocean floor, a vacuum pipe coupling section extending upwardly at an acute angle from said frame, with its intake end at substantially said vertex, means for separating from available items on said ocean floor, items of a predetermined range size, said means including grating extending across the path traversed by relative flow of material to the intake end of said pipe coupling section and sloping upwardly and in a generally rearwardly direction, said grating having a spacing between grating elements approximately half the diameter of said pipe coupling section to elevate and discard rearwardly of said pick-up head assembly items exceeding in size such spacing, during movement of said pick-up head assembly, along the ocean floor, means for freeing such items from the silt layer normally existing on the ocean floor during such movement, for facilitating gathering in of such items toward said grating for assortment during such movement, said means including a plurality of prongs affixed to and along said wing members and extending below the lower edges thereof and in the general direction of intended movement of said pick-up head assembly, and skid means for supporting said pick-up head assembly against excessive penetration thereof into such silt layer while said pick-up head is in movement along said ocean bottom.

4. A pick-up head assembly adapted for deep sea mining along the ocean floor, comprising a substantially bottomless V-shape frame including a pair of generally horizontally disposed frame wing members converging rearwardly to a vertex and adapted to traverse the ocean floor with said frame lying substantially parallel to the ocean floor, a vacuum pipe coupling section extending upwardly at an acute angle to said frame with its intake end at substantially said vertex, means for separating from available items on said ocean floor, items of a predetermined range size, said means including grating extending across the path traversed by relative flow of material to the vertex and of said pipe coupling section and sloping upwardly and in a generally rearwardly direction, said grating having a spacing between grating elements approximately half the diameter of said pipe coupling section to elevate and discard rearwardly of said pick-up head assembly items exceeding in size such spacing, during movement of said pick-up head assembly, along the ocean floor, means for freeing such items from the silt or sedimentary layer normally existing on the ocean floor during such movement, for facilitating gathering in of such items toward said grating for assortment during such movement, said means including a plurality of prongs affixed to and along said wing members and extending below the lower edges thereof and in the general direction of intended movement of said pick-up head assembly, and skid means for supporting said pick-up head assembly against excessive penetration thereof into such silt layer while said pick-up head is in movement along said ocean bottom.

5. A pick-up head assembly adapted for deep sea mining along the ocean floor, comprising a substantially bottomless V-shape frame including a pair of generally horizontally disposed frame wing members converging rearwardly to a vertex and adapted to traverse the ocean floor with said frame lying substantially parallel to the ocean floor, a vacuum pipe coupling section extending upwardly at an acute angle to said frame with its intake end at substantially said vertex, means for separating from available items on said ocean floor, items of a predetermined range size, as said frame gathers in items along the ocean floor during movement of said frame therealong, said means including grating extending across the path traversed by relative flow of material to the vertex and of said pipe coupling section and extending upwardly and in a generally rearwardly direction, said grating having a spacing between grating elements approximately half the diameter of said pipe coupling section to elevate and discard rearwardly of said pick-up head assembly items exceeding in size, such spacing, during movement of said pick-up head assembly, along the ocean floor, means for freeing such items from the silt or sedimentary layer normally existing on the ocean floor during such movement, for facilitating gathering in of such items toward said grating for assortment during such movement, said means including a plurality of prongs affixed to and along said wing members and extending below the lower edges thereof and in the general direction of intended movement of said pick-up head assembly, and means for supporting said pick-up head assembly against excessive penetration thereof into such silt layer while said pick-up head is in movement along said ocean bottom, said means including skids depending from said frame and means for adjusting the elevation of said frame relative to said skids, said last means including two-way hydraulic cylinder assemblies coupling said skids to said frame.

References Cited by the Examiner

UNITED STATES PATENTS

| | | | |
|---|---|---|---|
| 216,061 | 6/1879 | Shaw | 37—58 |
| 1,097,722 | 5/1914 | Lake | 37—58 |
| 1,100,753 | 6/1914 | Long | 37—58 |
| 1,327,651 | 1/1920 | Beaver | 37—58 |
| 2,337,818 | 12/1943 | Hill | 37—58 |
| 2,995,842 | 8/1961 | Korste | 37—58 |
| 3,010,232 | 11/1961 | Skakel | 37—58 |

FOREIGN PATENTS

| | | |
|---|---|---|
| 829,574 | 1/1952 | Germany. |
| 873,734 | 7/1961 | Great Britain. |

ABRAHAM G. STONE, *Primary Examiner.*

BENJAMIN HERSH, *Examiner.*

GODFREY T. MOLLER, JR., *Assistant Examiner.*